(12) United States Patent
Marquez et al.

(10) Patent No.: US 10,158,997 B2
(45) Date of Patent: Dec. 18, 2018

(54) WIRELESS SYSTEM WITH SECURE RANGE DETERMINATION

(71) Applicant: Apple Inc., Cupertino, CA (US)

(72) Inventors: Alejandro J. Marquez, Sunnyvale, CA (US); Tushar R. Shah, Cupertino, CA (US); Mohit Narang, Cupertino, CA (US); Indranil S. Sen, Santa Clara, CA (US); Shang-Te Yang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/468,016

(22) Filed: Mar. 23, 2017

(65) Prior Publication Data

US 2017/0303127 A1    Oct. 19, 2017

Related U.S. Application Data

(60) Provisional application No. 62/322,525, filed on Apr. 14, 2016.

(51) Int. Cl.
*H04W 12/08* (2009.01)
*H04L 29/06* (2006.01)
*H04W 4/02* (2018.01)
*H04L 29/08* (2006.01)

(52) U.S. Cl.
CPC .............. *H04W 12/08* (2013.01); *H04L 69/22* (2013.01); *H04L 69/323* (2013.01); *H04W 4/023* (2013.01)

(58) Field of Classification Search
CPC ........ H04W 28/06; H04W 12/08; H04L 69/04
See application file for complete search history.

(56) References Cited

U.S. PATENT DOCUMENTS

| | | | | |
|---|---|---|---|---|
| 6,466,566 | B1 * | 10/2002 | De Gaudenzi | H04B 1/71055 370/342 |
| 7,792,091 | B2 | 9/2010 | Sahinoglu et al. | |
| 8,243,859 | B2 | 8/2012 | Mo et al. | |
| 9,246,725 | B2 | 1/2016 | Oh et al. | |
| 2009/0185549 | A1 * | 7/2009 | Shon | H04L 69/04 370/349 |
| 2009/0225734 | A1 * | 9/2009 | Stephens | H04W 28/06 370/338 |
| 2009/0285240 | A1 * | 11/2009 | Zhang | H04J 13/0014 370/476 |

(Continued)

*Primary Examiner* — Myron Wyche
(74) *Attorney, Agent, or Firm* — Treyz Law Group, P.C.; G. Victor Treyz; Tianyi He (57) ABSTRACT

A wireless network may include devices that wirelessly transmit and receive packets. Each packet may include a preamble, a start-of-frame delimiter, a physical layer header, a sequence of symbols between the start-of-frame delimiter and the physical layer header, and a data payload. The sequence of symbols may have a pattern that is resistant to spoofing attacks. A receiving device may have a correlator that correlates known symbols against the symbols in the sequence using overlapping three-symbol-length correlation windows. Early arrival peaks in the output of the correlator may be used to correct time stamp information in the packets and late arrival peaks corresponding to spoofed signals from an attacker may be ignored. Time stamp information may be processed to determine ranges between transmitting and receiving devices.

19 Claims, 5 Drawing Sheets

(56) References Cited

U.S. PATENT DOCUMENTS

2013/0223577 A1* 8/2013 Xu .................. H04L 27/2663
                                                      375/354
2015/0264598 A1   9/2015 Park et al.
2016/0323056 A1  11/2016 Park et al.

* cited by examiner

WIRELESS SYSTEM WITH SECURE RANGE DETERMINATION

This application claims the benefit of provisional patent application No. 62/322,525, filed Apr. 14, 2016, which is hereby incorporated by reference herein in its entirety.

BACKGROUND

This relates generally to electronic devices, and, more particularly, to wireless electronic devices that use two-way time-of-flight ranging techniques to ascertain the distance between a pair of devices.

Wireless electronic devices can communicate using a variety of wireless communications protocols. For example, cellular telephone communications protocols may be used to allow cellular telephones to communicate with wireless base stations and wireless local area network protocols such as the IEEE 802.11 protocol may be used by wireless devices to communicate with wireless routers.

Low power communications protocols such as the IEEE 802.15.4 ultra wide band standard are used in wireless sensor networks and systems that support real time location services. It may sometimes be desirable to ascertain the distance between devices. In a typical scenario, a pair of devices may exchange timestamped wireless messages and may analyze the time stamps in the messages to determine the range between the two devices. Appropriate actions may then be taken based on the range information extracted from the messages. For example, a wireless key fob may be permitted to unlock a vehicle door only if the wireless key fob is determined to be within close proximity to the vehicle. For applications such as these, it is desirable for range measurements to be made accurately to prevent unauthorized access to the vehicle.

SUMMARY

A wireless network may include devices that wirelessly transmit and receive packets. Each packet may include a preamble, a start-of-frame delimiter, a physical layer header, a sequence of symbols between the start-of-frame delimiter and the physical layer header, and a data payload. The sequence of symbols may have a pattern that is resistant to spoofing attacks. The sequence of symbols may include multiple different symbols, may include blank symbols that flank respective non-blank symbols, may have non-repeating patterns, and/or may have other patterns.

A receiving device may have a correlator that correlates known symbols against the symbols in the sequence. The correlator may, for example, perform correlation operations using overlapping three-symbol-length correlation windows. Early arrival peaks in the output of the correlator may be used to correct time stamp information in the packets and late arrival peaks corresponding to spoofed signals from an attacker may be ignored. Time stamp information and information from the correlation operations may be processed to determine ranges between transmitting and receiving devices.

DETAILED DESCRIPTION

In some wireless systems the services that are provided may depend on the distance between nodes. For example, consider a system in which a first wireless device such as a wireless key fob is used to control a second wireless device such as a vehicle. In this type of system, it may be desirable for the vehicle door to be unlocked only when the wireless key fob is close to the vehicle. By requiring that the distance between the key fob and vehicle be small before the door is unlocked, unintentional unlocking of the door and unauthorized access to the vehicle can be prevented.

Wireless network protocols such as the IEEE 802.15.4 network protocol have been developed to address the need for range-based wireless services. In an IEEE 802.15.4 system, a pair of devices (sometimes referred to as nodes) may exchange wireless time stamped messages. Time stamps in the messages may be analyzed to determine the time of flight of the messages and thereby determine the distance (range) between the devices.

Figure 1:
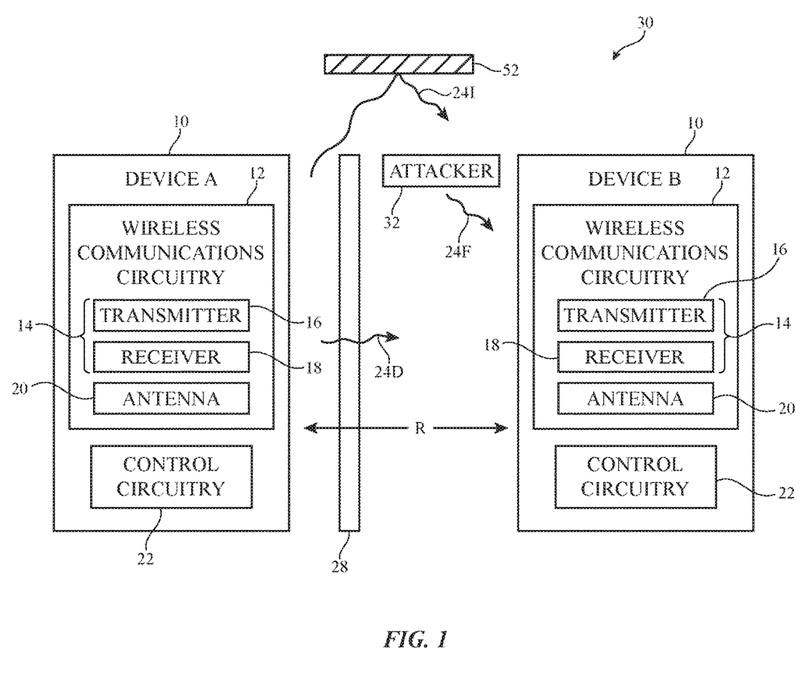
FIG. 1 is a schematic diagram of a wireless system in accordance with an embodiment.

An illustrative system of the type that may include devices that exchange wireless time stamped messages to perform two-way time-of-flight ranging operations is shown in FIG. 1. As shown in FIG. 1, wireless system 30 may include a pair of wireless devices 10 (device A and device B, sometimes referred to as node A and node B). Each device may include control circuitry 22 and wireless circuitry 12. Control circuitry 22 may include microprocessors, application specific integrated circuits, and other control circuitry. Wireless communications circuitry 12 may include transceiver circuitry 14 and one or more antennas 20. The transceiver circuitry 14 of each device 10 may include a radio-frequency transmitter 16 and a radio-frequency receiver 18. Wireless circuitry 12 may operate in a 2.4 GHz frequency band and/or at other suitable frequencies. Wireless circuitry 12 may support communications using the IEEE 802.15.4 protocol and/or other wireless communications protocols.

Device A and device B may exchange wireless messages as part of a two-way time-of-flight range determination. Each message may be time stamped. By processing the time stamp information, the time-of-flight of the wireless messages between devices A and B can be determined. The range (distance) between devices A and B can then be determined based on the time-of-flight information.

In the absence of any objects that reflect signals, wireless messages may travel directly between devices A and B. In this type of scenario, devices A and B may use the time stamp information from the messages without modification because the time of flight computed from the time stamp information will correspond to the time of flight of signals traveling along the shortest path between devices A and B. In the presence of structures that introduce reflections into the wireless paths between devices A and B, multiple versions of each message may be received (i.e., both direct and reflected messages). Additional processing may then be used to disambiguate between the direct and reflected messages and thereby determine the shortest time-of-flight and actual range between devices.

Consider, as an example, the scenario of FIG. 1. In the example of FIG. 1, a wireless message is being transmitted from device A to device B. The wireless message in the example of FIG. 1 travels to device B along two different paths. The first path (direct path 24D) is associated with the shortest distance between devices A and B and (in the FIG. 1 example) and its signals are weakened by passing through obstruction 28. The second path (indirect path 24I) is associated with reflections of wireless signals from external object 26. In an attempt to attack the security of system 30, an attacker (e.g., attacker 32 of FIG. 1) may intercept wireless signals traveling along path 24I and may modify and retransmit these signals to device B as spoofed signals 24F in an attempt to mislead device B about the range between devices A and B. The actual range R between devices A and B is associated with the time-of-flight of signals passing along path 24D. Because of the potential presence of an attacker such as attacker 32 in system 30, care should be taken to avoid being misled by any spoofed signals 24F when processing the time-of-flight information from the messages exchanged by devices A and B to distinguish between signals traveling along paths 24D and 24I. This allows range R to be accurately determined.

Figure 2:
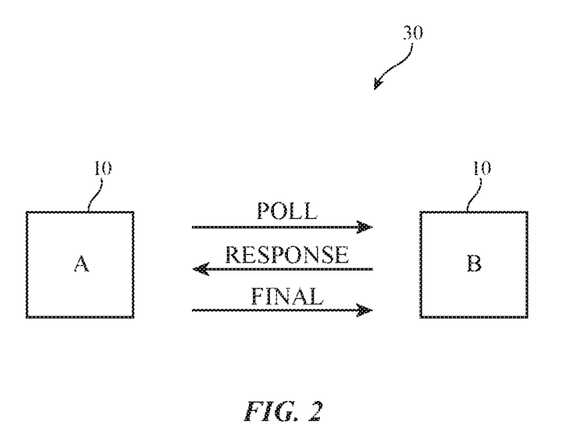
FIG. 2 is a diagram of a pair of electronic devices exchanging wireless messages as part of a two-way time-of-flight ranging process in accordance with an embodiment.

FIG. 2 is a diagram of illustrative messages that may be exchanged when performing two-way time-of-flight ranging with devices A and B. In the example of FIG. 2, device A transmits a time-stamped polling message ("POLL"). In response, device B transmits a time-stamped response message ("RESPONSE"). Device A responds to the response message from device B by transmitting a time-stamped final message ("FINAL"). In the absence of reflections or attacks, the time-stamp information from these messages may be processed to accurately determine range R. In the presence of a reflection, the relative timing between reflected and direct transmissions can be used to correct the time stamp information and thereby accurately compute range.

Figure 3:
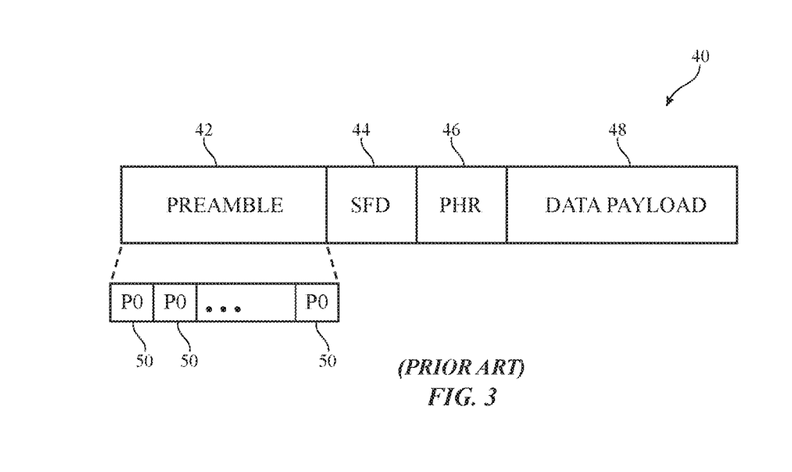
FIG. 3 is a diagram of a conventional IEEE 802.15.4 packet format.

FIG. 3 is a diagram of a conventional IEEE 802.15.4 packet. As shown in FIG. 3, packet 40 may include preamble 42 (composed of 16-4096 1 microsecond symbols 50—e.g., symbols P0 in the example of FIG. 3), start-of-frame delimiter (SFD) 44 (e.g., a segment of 8 or 64 symbols including packet time stamp information), physical layer header (PHR) 46, and data payload 48 (0-127 coded octets).

Figure 4:
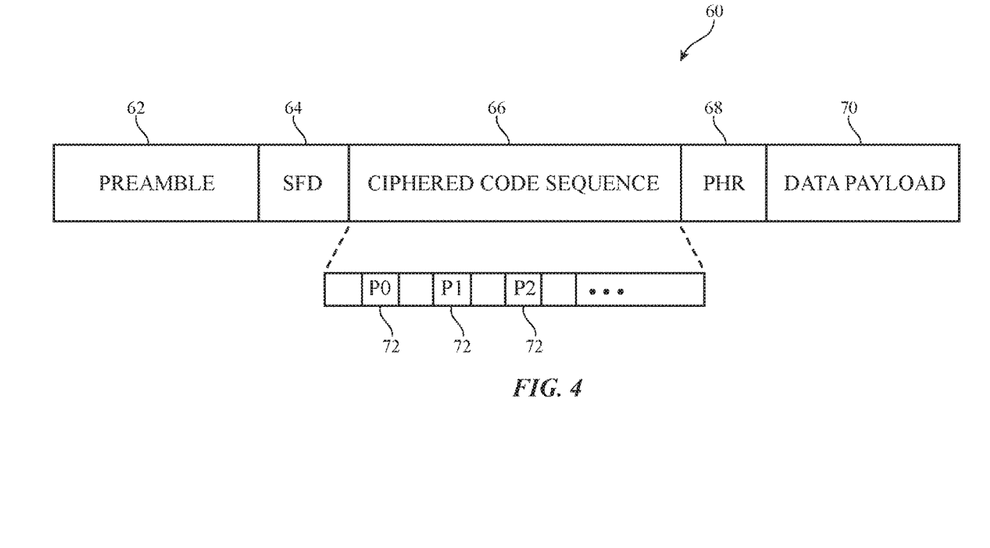
FIG. 4 is a diagram of an illustrative packet format for wireless communications in accordance with an embodiment.

FIG. 4 is a diagram of a packet of the type that may be used to ensure accurate time-of-flight and range measurements in system 30. As shown in FIG. 4, packet 60 may include preamble 62, start-of-frame delimiter (SFD) 64 (e.g., a segment of 8 or 64 symbols including packet time stamp information), physical layer header (PHR) 68, and data payload 70 (e.g., 0-127 coded octets). Ciphered code sequence 66 may be located between start-of-frame-delimiter 64 and physical layer header 68 and may include a predetermined pattern of symbols 72. Information on the pattern in which symbols 72 are presented within sequence 66 can be securely exchanged between devices A and B in advance (and may therefore represent a shared secret between devices A and B). Unlike preamble 42, in which symbol 50 is repeated, the sequence of symbols 72 in ciphered code sequence 66 is non-repeating. In the example of FIG. 4, symbols 74 include symbols (codes) P0, P1, P2 . . . separated by intervening blank symbols (i.e., each non-blank symbol is flanked by a pair of adjacent blank symbols, which serve as guard intervals). In this way, each segment of three symbols in sequence 66 is overlapping (because the guard interval portion at the end of each segment of three symbols overlaps the guard interval portion of the beginning of the next segment) and, in this example, is unique. If desired, other non-repeating symbol sequences may be used (e.g., sequences made up of non-repeating symbols such as sequences made up of a series of unique or repeating three-symbol blocks or other symbol patterns with more than one symbol, etc.). The example of FIG. 4 is merely illustrative.

The receiver 18 of the receiving device of system 30 (i.e., wireless communications circuitry 12) includes a correlator that correlates known symbols P0, P1, P2, with respective sets of incoming overlapping three-symbol segments of sequence 66 (sometimes referred to as three-symbol-interval segments). This information is then processed to determine whether or not there are any "early arrival" signals indicative of a direct weak signal (e.g., a signal along path 24D of FIG. 1). If no early arrival signals are identified, the raw time stamp information from the received messages can be used to determine range R. If early arrival signals are present, indicating that path 24D has a time of flight that is a given amount of time less than the time of flight of path 24I, each time stamp may be reduced by the given amount of time to correct the time stamp information and ensure that range R accurately corresponds to distance R of path 24D rather than the distance along path 24I.

Figure 5:
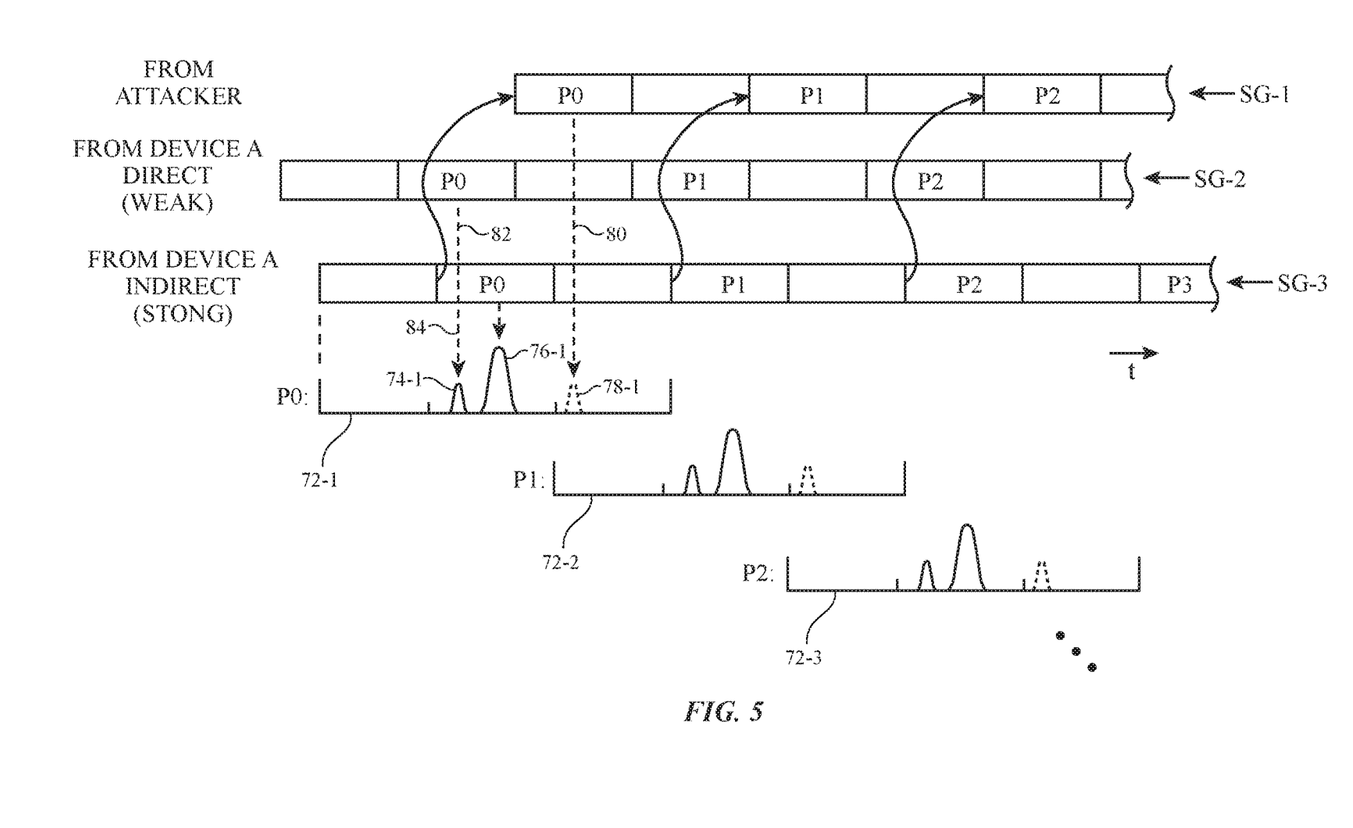
FIG. 5 is a diagram showing how ranging determinations may be accurately made accurately in the presence of a spoofing attack in accordance with an embodiment.

FIG. 5 is a diagram showing the results of this type of receiver correlation operation. In the example of FIG. 5, three are three received signals at the receiving device (device B in this example): signal SG-1, signal SG-2, and signal SG-3. Signal SG-2 is the faithful direct signal from device A along path 24D and is relatively weak due to the presence of obstruction 28. Signal SG-3 is a version of the transmitted signal from device A that has traveled along indirect path 24I. Because path 24I is longer than path 24D, signal SG-2 is received before signal SG-3 (e.g., each of the symbols in sequence 66 of signal SG-2 is characterized by an arrival time that is early with respect to the corresponding reflected version of each of these symbols in sequence 66 of signal SG-3). Due to the presence of obstruction 28, the strength of signal SG-2 is weaker than the strength of signal SG-3. Signal SG-1 is a fake (spoofed) signal created by attacker 32 by receiving and delaying sequence 66 of strong signal 24I and retransmitting a corresponding delayed version of the received sequence along path 24F in an attempt to mislead device B about the true value of range R (i.e., to trick device B into believing that range R is smaller than it really is).

In a conventional IEEE 802.15.4 network scenario, the attacker's strategy would delay each symbol P0 of preamble 42 of a transmitted packet 40 from device A by an amount sufficient to make it appear as though the attacker's symbols P0 were actually arriving early relative to the symbols P0 of the transmitted packet 40. The correlator of the receiving device would therefore produce an output indicating the presence of "early arrival" symbols even though the symbols are not, in actuality, early. In response, the receiving device would assume that the time-of-flight information in the authentic packet 40 would need to be reduced by an amount of time equal to the difference between the time at which each authentic symbol P0 is received and the time at which the attacker's fake symbol P0 is received. Although the attacker's delayed version of the preamble is fake, the conventional IEEE 802.15.4 scheme would potentially allow the attacker to trick a receiver into believing that range R between device A and device B is smaller than it actually is, creating a potential security breach (e.g., unlocking a door in device B, etc.). In system 30 of FIG. 1, in contrast, the symbols of sequence 66 and the correlation scheme used to process received signals are resistant to attack from attacker 32.

As shown in FIG. 5, the correlator in the receiver of the receiving device (i.e., device B in the example of FIG. 5) aligns correlation windows 72-1, 72-2, 72-3 . . . with the symbols of the strongest received signal (i.e., signal SG-3). Each correlation window is three symbols in width (i.e., the duration of each correlation window is three symbol intervals). In each of the three symbol locations (intervals) of window 72-1, the correlator correlates the received signal with symbol P0. In each of the three symbol locations of window 72-2, the correlator correlates the received signal with symbol P1. In each of the three symbol locations of window 72-3, the correlator correlates the received signal with symbol P2, etc. The position of each successive correlation window overlaps by one symbol width with the next. For example, correlation windows 72-1 and 72-2 overlap by a symbol width, correlation windows 72-2 and 72-3 overlap by a symbol width, etc. If desired, a three-symbol integration may be used for spoofer detection while a single symbol integration is used to improve signal quality.

All of the incoming signals (SG-1, SG-2, and SG-3) of FIG. 5 have been mixed prior to performing correlation operations with the receiver (i.e., the signals have all been received by the same antenna and receiver). As indicated by dashed line 82, the correlation by the correlator of symbol P0 of window 72-1 with symbol P0 of strong signal SG-3 results in main symbol correlation peak 76-1. As indicated by dashed line 84, the correlation by the correlator of symbol P0 of window 72-1 with symbol P0 of weak signal SG-2 results in weak "early arrival" symbol correlation peak 74-1. Because peak 74-1 is present at a time before peak 76-1, the receiving device may use the time difference between peaks 74-1 and 76-1 to update the time stamp information in the exchanged messages (e.g., the time stamp values may be decreased by an amount of time equal to the time difference between peaks 74-1 and 76-1). As a result, the range R will be accurately computed based on the time of flight of each symbol in weak signal SG-2 rather than the time of flight of the delayed version of these symbols in reflected signal SG-2.

The receiving device is also able to ignore the attacker's signal. As shown in FIG. 5, the attacker is attempting to spoof sequence 66 from device A by copying strong signal SG-3 and by delaying the copied version of this signal by a fraction of one symbol. In a packet scheme of the type shown in FIG. 3, the delay of preamble symbols P0 of preamble 42 by a fraction of a symbol length by an attacker would make each delayed symbol appear to be early. These fake early arrival symbols would then be erroneously used to shorten the time-of-flight information gathered from the time stamps and would lead to an erroneous belief on the part of the receiver that the range R between devices A and B is short. Due to the pattern used for sequence 66 in the example of FIG. 5, however, this type of attack does not produce a fake "early arrival" peak in the output of the correlator. Rather, as indicated by dashed line 80, the correlation by the correlator of symbol P0 of window 72-1 with fake delayed symbol P0 from signal SG-1 produces fake symbol correlation peak 78-1. As shown in FIG. 5, fake symbol correlation peak 78-1 is located in the third symbol location of window 72-1 and therefore appears to be late relative to main correlation peak 76-1 in the second symbol location of window 72-1. Because peak 78-1 is late relative to peak 76-1, peak 78-1 may be discarded (ignored).

Due to the pattern of sequence 66 and the corresponding cycling of the symbol used by the correlator (i.e., to symbol P1 for window 72-2, to P2 for window 72-3, etc.), the correlation peaks of each of the correlator windows will appear in the configuration shown by peaks 74-1, 76-1, and 78-1 of window 72-1. As the correlator performs each correlation (i.e., first with symbol P0 for each of the symbol-length slots in window 72-1, second with symbol P1 for each of the symbol-length slots in window 72-2, third with symbol P2 for each of the symbol-length slots in window 72-3, etc.) the output of the correlator (e.g., peaks such as peaks 74-1, 76-1, and 78-1) can be gathered in an accumulator in the receiver. The receiver can analyze the relative positions of the peaks in the accumulator and can discard (i.e., ignore) late arrival peaks such as fake symbol peak 78-1. In the absence of early arrival peaks such as peak 74-1, raw time stamp information may be used to compute time-of-flight information and thereby used to compute range R. In the presence of early arrival peaks such as peak 74-1, the raw time stamp information can be corrected (i.e., the time difference between peaks 76-1 and 74-1 can be subtracted from the time stamp information to accurately compute range R).

Figure 6:
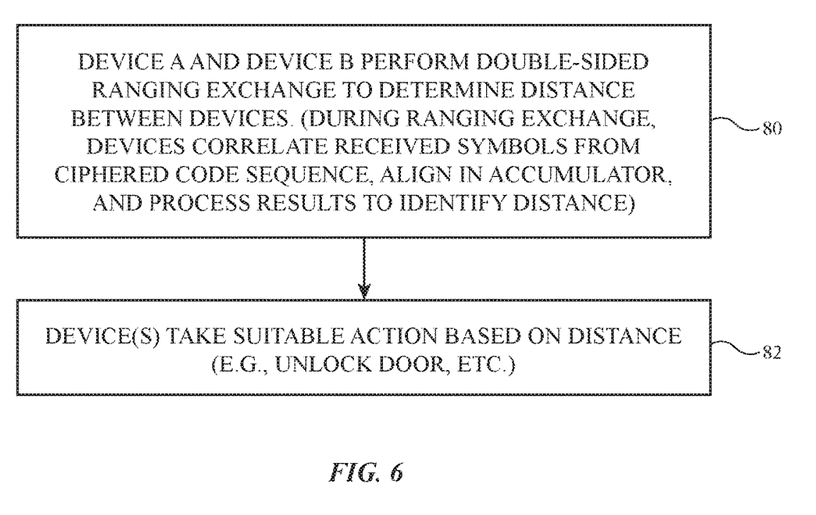
FIG. 6 is a flow chart showing illustrative operations involved in operating wireless devices in a network of the type shown in FIG. 1 using packets of the type shown in FIG. 4 in accordance with an embodiment.

FIG. 6 is a flow chart of illustrative operations involved in processing and using wireless messages (packets) of the type shown in FIG. 4 to perform two-way time-of-flight ranging in a system of the type shown in FIG. 1.

At step 80, devices A and B may perform a double-sided ranging exchange by sending packets for respective polling, response, and final messages, as described in connection with FIG. 2. Each message may be formed from a packet containing sequence 66 of FIG. 4. Sequence 66, which may be located between start-of-frame delimiter 64 and physical layer header 68, may contain a pattern of symbols of the type shown by signal SG-2 of FIG. 5 or other suitable pattern of symbols (e.g., a sequence that includes multiple different symbols and/or symbols with a non-repeating pattern or other pattern to defeat spoofing attacks). Some of the signal may be reflected and therefore may be delayed relative to signal SG-2. In the presence of an attacker, an additional signal such as attacker signal SG-1 may be present. During signal reception operations, each receiver performs correlation operations of the type shown in FIG. 5 and analyses the correlation peaks present in the accumulator. Late arrival peaks correspond to attacker signals and can be discarded. Early arrival peaks correspond to direct paths such as direct path 24D of FIG. 1 and can therefore be used to update the raw time stamp information in the packets and thereby accurately determine range R. Range R may be computed using wireless circuitry 12 and/or other control circuitry in devices 10 (see, e.g., control circuitry 22).

At step 82, devices 10 (e.g., control circuitry 22) may take suitable actions based on range R. For example, range R may be compared to a predetermined threshold value Rt. In response to a determination that range R is greater than value Rt, no action may be taken (as an example). In response to a determination that range R is less than threshold value Rt, a door may be unlocked (or primed for unlocking in response to user contact with a capacitive touch sensor on a door handle or other appropriate user input), an alert may be created for a user, or other action may be taken.

Although sometimes described herein in the context of IEEE 802.15.4-type protocols, ciphered code sequence 66 may, if desired, be incorporated into packets used in IEEE 802.11ad systems any other suitable wireless communications systems. Moreover, ciphered code sequence 66 need not be located between start-of-frame delimiter 64 and physical layer header 68. For example, ciphered code sequence 66 may be located after data payload 70 or in other suitable locations after preamble 62.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   control circuitry; and
   wireless circuitry that the control circuitry uses to transmit packets that each contain a preamble, a start-of-frame delimiter, a physical layer header, a sequence of symbols between the start-of-frame delimiter and the physical layer header, and a data payload, wherein the sequence of symbols includes blank symbols and non-blank symbols, and the non-blank symbols include at least two non-blank symbols that are different.

2. The electronic device defined in claim 1 wherein each of the non-blank symbols is flanked by two of the blank symbols in the sequence.

3. The electronic device defined in claim 2 wherein each of the non-blank symbols in the sequence is different.

4. The electronic device defined in claim 1 wherein the sequence of symbols includes a plurality of non-blank symbols that differ from each other and wherein the packets include time stamp information that is corrected using the sequence of symbols.

5. Apparatus, comprising:
   control circuitry; and
   a receiver that the control circuitry uses to receive wireless packets each of which includes a preamble, a start-of-frame delimiter, a physical layer header, a sequence of symbols between the start-of-frame delimiter and the physical layer header, and a data payload, wherein the receiver is configured to correlate the sequence of symbols against known symbols using a three-symbol-length correlation window.

6. The apparatus defined in claim 5 wherein the sequence of symbols includes non-repeating symbols.

7. The apparatus defined in claim 5 wherein the sequence of symbols includes blank symbols and non-blank symbols.

8. The apparatus defined in claim 7 wherein each of the non-blank symbols is flanked by two of the blank symbols in the sequence.

9. The apparatus defined in claim 5 wherein the receiver is configured to produce correlation peaks including a main peak corresponding to a reflected signal and an early arrival peak corresponding to a direct signal that is weaker than the reflected signal.

10. The apparatus defined in claim 7 wherein all of the non-blank symbols in the sequence are different from each other.

11. A method of processing received packets for two-way time-of-flight ranging in a system in which a first device transmits packets wirelessly to a second device, the method comprising:
    with a receiver in the second device, receiving the transmitted packets, each received packet including a preamble, a start-of-frame delimiter, a physical layer header, a data payload, and a sequence of symbols that is located within the packet at a selected one of: 1) between the start-of-frame delimiter and the physical layer header, and 2) after the data payload, wherein receiving the transmitted packets comprises receiving, for the sequence of symbols, a plurality of blank symbols between respective pairs of different symbols.

12. The method defined in claim 11 wherein the sequence of symbols is between the start-of-frame delimiter and the physical layer header and wherein each pair in the respective pairs of different symbols comprises a pair of different symbols.

13. The method defined in claim 12 further comprising:
    with a correlator in the receiver, correlating known symbols with respective overlapping three-symbol segments of the sequence.

14. The method defined in claim 13 wherein each overlapping three-symbol segment of the sequence includes a given one of the plurality of different symbols and includes two blank symbols flanking that symbol.

15. The method defined in claim 13 further comprising updating raw time-of-flight information from the packets using results from the correlation of the known symbols with the overlapping three-symbol segments of the sequence.

16. The method defined in claim 15 further comprising ignoring late arrival peaks produced from correlating the known symbols against the respective overlapping three-symbol segments of the sequence.

17. The electronic device defined in claim 1 wherein the sequence of symbols comprises first and second blank symbols, and a first non-blank symbol in the at least two non-blank symbols is between the first bank symbol and the second blank symbol in the sequence of symbols.

18. The electronic device defined in claim 17 wherein the sequence of symbols includes a third blank symbol in the blank symbols, and a second non-blank symbol in the at least two non-blank symbols is between the second blank symbol and the third blank symbol in the sequence of symbols.

19. The electronic device defined in claim 1 wherein the at least two non-blank symbols are separated by a blank symbol in the sequence of symbols.

* * * * *

UNITED STATES PATENT AND TRADEMARK OFFICE
CERTIFICATE OF CORRECTION

PATENT NO. : 10,158,997 B2
APPLICATION NO. : 15/468016
DATED : December 18, 2018
INVENTOR(S) : Alejandro J. Marquez et al.

Page 1 of 1

It is certified that error appears in the above-identified patent and that said Letters Patent is hereby corrected as shown below:

In the Claims

Column 8, Line 42, In Claim number 17, "between the first bank symbol" should be "between the first blank symbol"

Signed and Sealed this
Twenty-sixth Day of November, 2019

Andrei Iancu
*Director of the United States Patent and Trademark Office*